United States Patent
Stenqvist et al.

(10) Patent No.: US 12,203,404 B2
(45) Date of Patent: Jan. 21, 2025

(54) METHOD OF OPERATING A REDUCING AGENT INJECTOR

(71) Applicant: VOLVO TRUCK CORPORATION, Gothenburg (SE)

(72) Inventors: Dan Stenqvist, Västra Frölunda (SE); Martin Wilhelmsson, Gothenburg (SE); Per-Johan Carlsson, Torslanda (SE)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 18/488,338

(22) Filed: Oct. 17, 2023

(65) Prior Publication Data
US 2024/0141816 A1    May 2, 2024

(30) Foreign Application Priority Data
Oct. 27, 2022   (EP) ..................................... 22204000

(51) Int. Cl.
*F01N 3/20*    (2006.01)
*B01D 53/94*    (2006.01)

(52) U.S. Cl.
CPC .......... *F01N 3/208* (2013.01); *B01D 53/9418* (2013.01); *B01D 53/9495* (2013.01);
(Continued)

(58) Field of Classification Search
CPC ............ B01D 53/9418; B01D 53/9495; B01D 2251/2067; B01D 2257/404; F01N 3/208;
(Continued)

(56) References Cited

U.S. PATENT DOCUMENTS

| 8,429,898 B2 | 4/2013 | Darr et al. |
| 8,516,798 B2 * | 8/2013 | Dobson ................... F01N 3/035 60/299 |
| 8,540,953 B2 * | 9/2013 | Toshioka ........... B01D 53/0454 422/111 |
| 8,596,042 B2 * | 12/2013 | Parmentier ............. F01N 3/208 60/275 |

(Continued)

FOREIGN PATENT DOCUMENTS

DE    102010002620 A1    9/2011

OTHER PUBLICATIONS

Extended European Search Report in corresponding European Application No. 22204000.8 dated Mar. 6, 2023 (7 pages).

*Primary Examiner* — Dapinder Singh
(74) *Attorney, Agent, or Firm* — Venable LLP; Jeffri A. Kaminski (57) ABSTRACT

A method of operating a reducing agent injector includes determining a reference level of toxic substances exhausted from a catalytic reduction arrangement when injecting reducing agent at the pre-set mass flow rate; controlling a reducing agent injector to inject reducing agent at a first mass flow rate, the first mass flow rate being different from the pre-set mass flow rate; determining a first level of toxic substances exhausted from the catalytic reduction arrangement after injecting reducing agent at the first mass flow rate; determining which one of the reference level of toxic substances and the first level of toxic substances being a lowest level of toxic substances; updating the pre-set mass flow rate of the predefined injection model to an updated pre-set mass flow rate as the mass flow rate causing the catalytic reduction arrangement to exhaust the lowest level of toxic substances; and controlling the reducing agent injector to inject reducing agent at the updated pre-set mass flow rate.

13 Claims, 4 Drawing Sheets

(52) U.S. Cl.
CPC ............... *B01D 2251/2067* (2013.01); *B01D 2257/404* (2013.01); *F01N 2610/146* (2013.01); *F01N 2900/0408* (2013.01); *F01N 2900/1402* (2013.01); *F01N 2900/16* (2013.01)

(58) Field of Classification Search
CPC .......... F01N 3/2066; F01N 3/206; F01N 3/20; F01N 3/0842; F01N 3/08; F01N 9/00; F01N 11/00; F01N 11/002; F01N 2600/146; F01N 2600/02; F01N 2560/021; F01N 2560/026; F01N 2900/1402; F01N 2900/1404; F01N 2900/0408; F01N 2900/16; F01N 2900/08; F01N 2900/1602; F01N 2570/14; Y02T 10/12; Y02T 10/40
See application file for complete search history.

(56) References Cited

U.S. PATENT DOCUMENTS

| | | | |
|---|---|---|---|
| 9,243,535 B2 | 1/2016 | Dahl et al. | |
| 10,029,210 B2* | 7/2018 | Takayanagi | B01D 53/9495 |
| 10,077,699 B2* | 9/2018 | Minezawa | B01D 53/9409 |
| 10,753,255 B2 | 8/2020 | Schweizer | |
| 2006/0130461 A1* | 6/2006 | Gabrielsson | B01D 53/9409 60/285 |
| 2007/0044456 A1* | 3/2007 | Upadhyay | F01N 3/208 60/297 |
| 2010/0223907 A1 | 9/2010 | Walde et al. | |
| 2011/0308233 A1* | 12/2011 | Darr | F01N 3/208 60/276 |
| 2017/0044950 A1* | 2/2017 | Minezawa | F01N 3/208 |

* cited by examiner

METHOD OF OPERATING A REDUCING AGENT INJECTOR

TECHNICAL FIELD

The inventive concept relates generally to reducing agent injectors. In particular aspects, the inventive concept relates to a method of operating a reducing agent injector. The inventive concept can be applied in heavy-duty vehicles, such as trucks, buses, and construction equipment. Although the inventive concept may be described with respect to a particular vehicle, the inventive concept is not restricted to any particular vehicle.

BACKGROUND

Conventional exhaust aftertreatment systems for, e.g., diesel engines often use a catalytic reduction arrangement to convert certain harmful exhaust components into less harmful substances. In one example of the process, a reducing agent is injected into an engine exhaust and hydrolyzes into ammonia, which flows into the catalyst. A chemical reaction involving the ammonia and the unwanted exhaust components within the catalytic reduction arrangement substrate reduces the unwanted exhaust component into Nitrogen gas and water. For the emission control to be robust in a wide range of driving conditions, the level of ammonia buffer stored in the catalytic reduction arrangement should preferably be controlled. In particular, should the ammonia buffer be too low, there is a risk of having too small amount of conversion of harmful exhaust, and should the ammonia buffer be too high, there is a risk that ammonia will be released and cause undesirable exhaust of harmful exhaust and ammonia emissions.

A conventional solution is to use a model of the catalytic reduction arrangement to decide setpoints on how to control the ammonia buffer. However, it has been realized that such model has deficiencies, in particular in terms of unexpected changes of ammonia buffer capacity when the catalytic reduction arrangement is somewhat degraded.

SUMMARY

According to a first aspect of the inventive concept, there is provided a method of operating a reducing agent injector, the reducing agent injector being configured to inject a reducing agent into a catalytic reduction arrangement arranged in downstream fluid communication with an internal combustion engine of a vehicle at a pre-set mass flow rate obtained by a predefined injection model, the method comprising determining a reference level of toxic substances exhausted from the catalytic reduction arrangement when injecting reducing agent at the pre-set mass flow rate; controlling the reducing agent injector to inject reducing agent at a first mass flow rate, the first mass flow rate being different from the pre-set mass flow rate; determining a first level of toxic substances exhausted from the catalytic reduction arrangement after injecting reducing agent at the first mass flow rate; determining which one of the reference level of toxic substances and the first level of toxic substances being a lowest level of toxic substances; updating the pre-set mass flow rate of the predefined injection model to an updated pre-set mass flow rate as the mass flow rate causing the catalytic reduction arrangement to exhaust the lowest level of toxic substances; and controlling the reducing agent injector to inject reducing agent at the updated pre-set mass flow rate.

The reducing agent should be construed as reduction liquid providing a chemical composition with the material of the catalytic reduction arrangement that will convert the environmentally harmful exhaust gas from the internal combustion engine into less harmful substances. The reducing agent may, according to a non-limiting example, be urea which is particularly suitable for reducing NOx-gases.

The first aspect of the inventive concept may seek to compensate for unexpected changes in hardware of a catalytic reduction arrangement, in particular for a catalytic reduction arrangement which is somewhat degraded. In particular, when a change in the mass flow rate results in a reduction in the level of toxic substances exhausted from the catalytic reduction arrangement compared to the level of toxic substances exhausted when reducing agent was injected at the pre-set mass flow rate, an indication is given that the changed mass flow rate should be used. The pre-set mass flow rate may thus be seen as a nominal mass flow rate based on the injection model. However, should the change in mass flow rate result in an increase in the level of toxic substances exhausted from the catalytic reduction arrangement, the pre-set mass flow rate should be kept.

A technical benefit may thus include that a catalytic reduction arrangement can be operated efficiently even when being aged and the buffer capacity has been degraded. Further, another technical benefit may include that the above-described method may assist to handle component deviations from production. For example, when a substrate of the catalytic converter arrangement differs from another one when it comes to an actual buffer capacity.

In some examples, the method may further comprise determining a first operating state of the catalytic reduction arrangement when determining the reference level of toxic substances, the first operating state being at least one of a reference temperature level of the catalytic reduction arrangement and an exhaust gas flow velocity through the catalytic reduction arrangement; and controlling the reducing agent injector to inject reducing agent at the first mass flow rate when the catalytic reduction arrangement assumes the first operating state. The comparison of the reference level of toxic substances and the first level of toxic substances is thus made at substantially the same operating condition and it may hereby be assured that the updated pre-set mass flow rate is determined correctly.

In some examples, the first mass flow rate may be an increased mass flow rate compared to the pre-set mass flow rate, the method may further comprise controlling the reducing agent injector to inject reducing agent at a second mass flow rate, the second mass flow rate being a decreased mass flow rate compared to the pre-set mass flow rate; determining a second level of toxic substances exhausted from the catalytic reduction arrangement after injecting reducing agent at the second mass flow rate; and determining which one of the reference level of toxic substances, the first level of toxic substances and the second level of toxic substances being the lowest level of toxic substances.

An iterative process may hereby be adopted, whereafter the lowest level of toxic substances is determined. By both increasing the mass flow rate as well as decreasing the mass flow rate, it may be even further assured that an optimized updated pre-set mass flow rate is selected. Accordingly, and in some examples, the method may further comprise selecting the second mass flow rate as the updated pre-set mass flow rate when the reference level of toxic substances, the first level of toxic substances and the second level of toxic substances are within a predetermined range.

In some examples, the reducing agent may be injected at the second mass flow rate when the catalytic reduction arrangement assumes the first operating state. The second level of toxic substances may advantageously be determined at substantially the same circumstances as when determining the reference level of toxic substances, as well as when determining the first level of toxic substances.

In some examples, the pre-set mass flow rate of the predefined injection model may be updated for a plurality of temperature levels of the catalytic reduction arrangement. Thus, each temperature level of the catalytic reduction arrangement may be provided with an updated pre-set mass flow rate. A technical advantage may be that the operational functionality of the catalytic reduction arrangement can be optimized for substantially all temperatures.

In some examples, the pre-set mass flow rate of the predefined injection model may be updated sequentially for the plurality of temperature levels of the catalytic reduction arrangement.

In some examples, the method may further comprise determining a time period since installation of the catalytic reduction arrangement; and transmitting the updated pre-set mass flow rate and the time period to a control server station. The process of determining the optimum mass flow rate may hereby be omitted for other vehicles in a fleet, since it can be assumed that a catalytic reduction arrangement for another vehicle will, more or less, assume a similar condition when aged in a similar manner.

In some examples, the catalytic reduction arrangement may be a selective catalytic reduction arrangement. When the catalytic reduction arrangement is a selective catalytic reduction arrangement, the reducing agent is preferably urea.

According to a second aspect of the inventive concept, there is provided an injection system, comprising a reducing agent injector configured to inject a reducing agent into a catalytic reduction arrangement arranged in downstream fluid communication with an internal combustion engine of a vehicle, and processing circuitry operatively coupled to the reducing agent injector, the processing circuitry comprises an injection manager operative to instruct the reducing agent injector to inject reducing agent at a pre-set mass flow rate, wherein the processing circuitry is configured to determine a reference level of toxic substances exhausted from the catalytic reduction arrangement when injecting reducing agent at the pre-set mass flow rate; transmit a message to the reducing agent injector, the message representing instructions to control the reducing agent injector to inject reducing agent at a first mass flow rate, the first mass flow rate being different from the pre-set mass flow rate; determine a first level of toxic substances exhausted from the catalytic reduction arrangement after injecting reducing agent at the first mass flow rate; determine which one of the reference level of toxic substances and the first level of toxic substances being a lowest level of toxic substances; update the pre-set mass flow rate of the predefined injection model to an updated pre-set mass flow rate as the mass flow rate causing the catalytic reduction arrangement to exhaust the lowest level of toxic substances; and transmit a message to the reducing agent injector, the message representing instructions to control the reducing agent injector to inject reducing agent at the updated pre-set mass flow rate.

In some examples, the injection system may further comprise a sensor configured to detect the level of toxic substances exhausted from the catalytic reduction arrangement. A sensor may advantageously sense the level of toxic substances exhausted from the catalytic reduction arrangement and transmit data to the processing circuitry for rapid action. In some examples, the sensor may be a NOx sensor.

Further effects and features of the second aspect are largely analogous to those described above in relation to the first aspect.

According to a third aspect of the inventive concept, there is provided a vehicle comprising an internal combustion engine, a catalytic reduction arrangement arranged in downstream fluid communication with the internal combustion engine, and an injection system according to any one of the embodiments described above in relation to the second aspect.

According to a fourth aspect of the inventive concept, there is provided a computer program product comprising program code for performing, when executed by the processing circuitry, the method of any of the examples described above in relation to the first aspect.

According to a fifth aspect of the inventive concept, there is provided a control system comprising one or more control units configured to perform the method according to any of the examples described above in relation to the first aspect.

According to a sixth aspect of the inventive concept, there is provided a non-transitory computer-readable storage medium comprising instructions, which when executed by a processing circuitry, cause the processing circuitry to perform the method of any of the examples described above in relation to the first aspect.

Effects and features of the third, fourth, fifth and sixth aspects are largely analogous to those described above in relation to the first and second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the inventive concept as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the inventive concept cited as examples.

DETAILED DESCRIPTION

Aspects set forth below represent the necessary information to enable those skilled in the art to practice the inventive concept.

The inventive concept described in the following with reference to the drawings may seek to solve the problem of unexpected changes in hardware of catalytic reduction arrangements, in particular for catalytic reduction arrangements which are somewhat degraded. An overall technical advantage of the below disclosure may thus be that the catalytic reduction arrangements can be efficiently operable for a longer duration of time, and that unexpected changes can be handled without the need of replacement or maintenance of parts.

Figure 1:
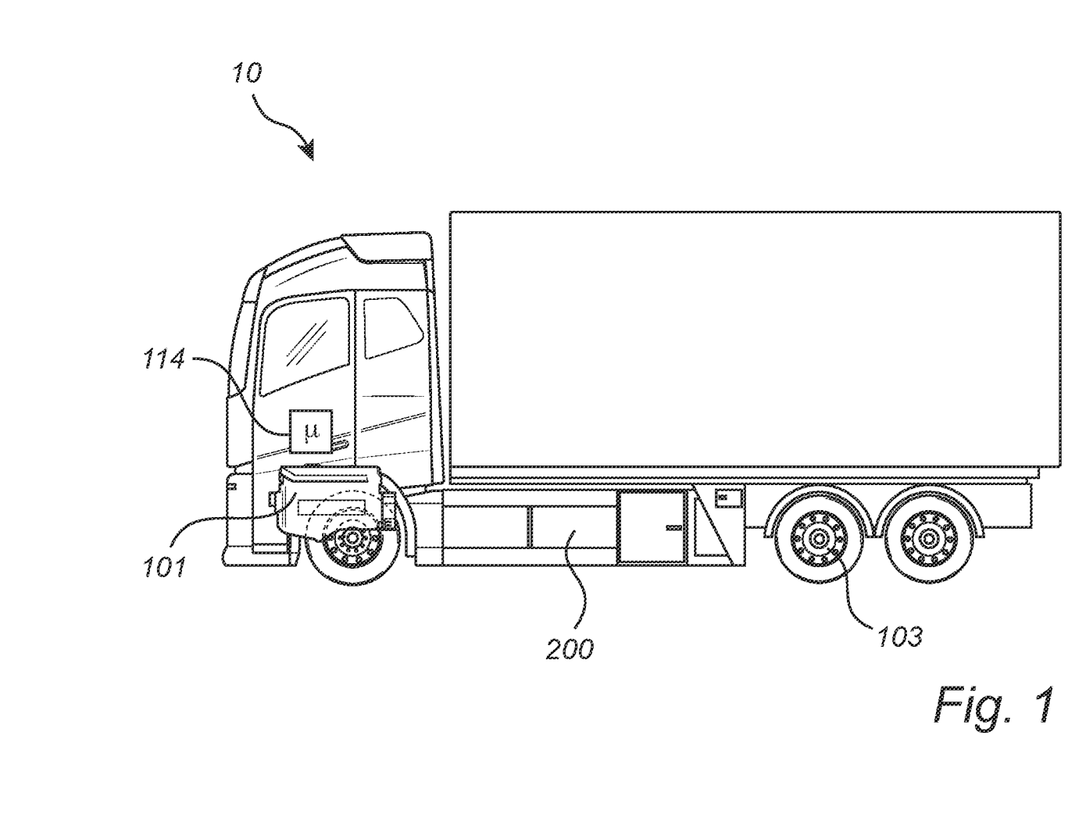
FIG. 1 is lateral side view of a vehicle in the form of a truck according to one example.

With reference to FIG. 1, there is depicted a vehicle 10 in the form of a truck. The vehicle 10 comprises a traction motor 101. The traction motor 101 is preferably an internal combustion engine and will in the following be referred to as such. The internal combustion engine 101 is operable to propel at least one pair of wheels 103 of the vehicle 10. The vehicle 10 further comprises an aftertreatment system 200 arranged in downstream fluid communication with the internal combustion engine 101. The vehicle 101 in FIG. 1 also comprises a control unit 114. The control unit 114 comprises processing circuitry (depicted in further detail in FIG. 5). The processing circuitry is operatively coupled to various parts of the aftertreatment system 200, as will be evident below.

Figure 2:
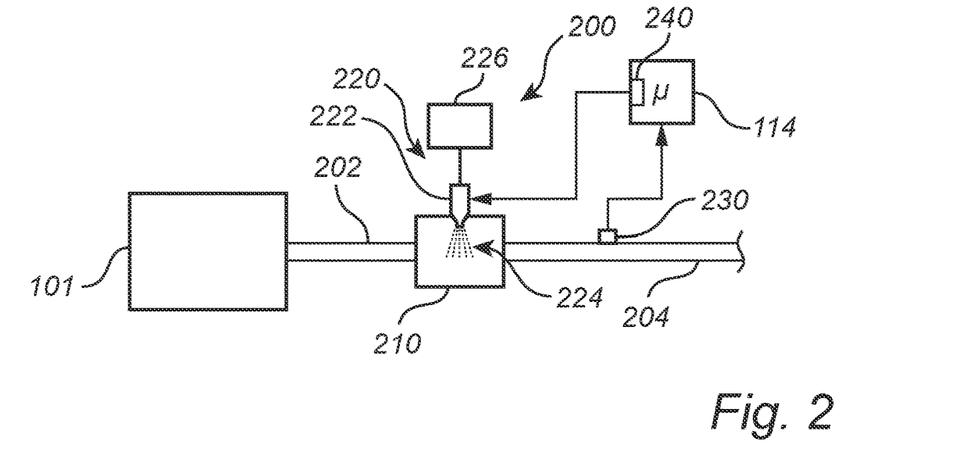
FIG. 2 is a schematic illustration of an aftertreatment system according to one example.

In order to describe the aftertreatment system 200 in further detail, reference is made to FIG. 2 which is a schematic illustration of an aftertreatment system 200 according to one example. The internal combustion engine 101 is also depicted in FIG. 2, although not forming part of the aftertreatment system 200. As can be seen in FIG. 2, the aftertreatment system 200 is arranged in downstream fluid communication with the internal combustion engine 101 via an exhaust conduit 202. Hence, exhaust gas generated by the internal combustion engine 101 during combustion is directed through the exhaust conduit 202 and into the aftertreatment system 200. An outlet conduit 204 is also connected to the aftertreatment system 200 through which the exhaust gas is directed after being treated in the aftertreatment system 200.

The aftertreatment system 200 comprises a catalytic reduction arrangement 210. The catalytic reduction arrangement 200 is merely schematically illustrated and is configured to convert environmentally harmful exhaust gas from the internal combustion engine 101 into less harmful substances which are exhausted to the ambient environment via the outlet conduit 204. According to an example, the catalytic reduction arrangement 210 may be a selective catalytic reduction arrangement.

Further, the aftertreatment system 200 comprises an injection system 220. The injection system 220 comprises a reducing agent injector 222 configured to inject a reducing agent 224 into the catalytic reduction arrangement 210. When injecting reducing agent 224, the reducing agent hydrolyzes to ammonia which forms an ammonia buffer. A chemical reaction involving the ammonia and unwanted exhaust components reduces the exhaust components into less harmful substances, such as e.g. Nitrogen gas and water. The chemical reaction thus converts the environmentally harmful exhaust gas from the internal combustion engine into less harmful substances. The reducing agent may, according to a non-limiting example, be urea which is particularly suitable for reducing NOx-gases. The injection system 220 also comprises a reducing agent reservoir 226. The reducing agent reservoir 226 may, for example, be a tank configured to contain the reducing agent. The reducing agent injector 222 is thus arranged in downstream fluid communication with the reducing agent reservoir 226 and hence receives reducing agent from the reducing agent reservoir 226 for injecting the reducing agent 224 into the catalytic reduction arrangement 210.

The exemplified aftertreatment system 200 depicted in FIG. 2 also comprises a sensor 230. The sensor 230 is configured to detect a level of toxic substances exhausted from the catalytic reduction arrangement 210. The sensor 230 is thus preferably positioned downstream the catalytic reduction arrangement 210. In FIG. 2, the sensor 230 is depicted as being arranged in the outlet conduit 204, but could also be connected to the catalytic reduction arrangement 210 at a downstream side thereof. According to an example, the sensor 230 may preferably be a NOx sensor configured to detect the level of NOx in the exhaust flow form the catalytic reduction arrangement 210.

As is also illustrated in FIG. 2, the control unit 114 is connected to the reducing agent injector 222 as well as to the sensor 230. The control unit 114 is thus configured to receive data indicative of the level of toxic substances from the sensor 230 and to control operation of the reducing agent injector 222. In particular, the control unit 114 comprises processing circuitry as described above. The processing circuitry comprises an injection manager 240. The injection manager 240 is operative to instruct the reducing agent injector 222 to inject reducing agent at a mass flow rate determined by the processing circuitry.

Figure 3A:
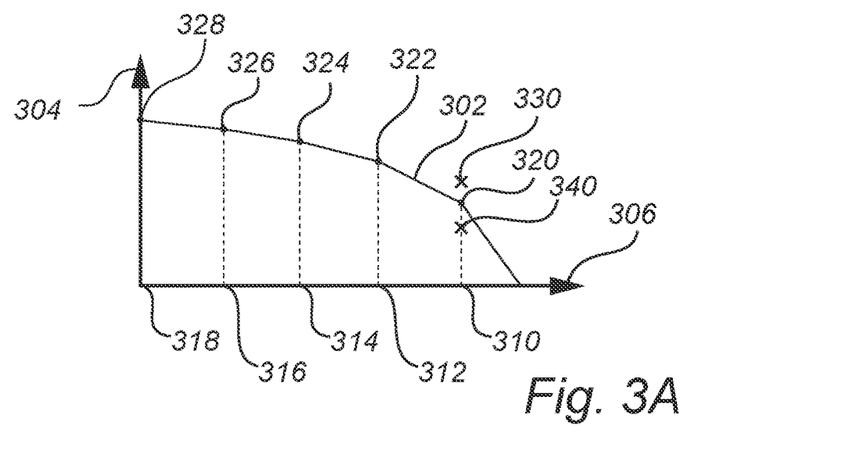
FIGS. 3a-3b are graphs illustrating a relationship between reducing agent buffer and temperature according to examples.
Figure 3B:
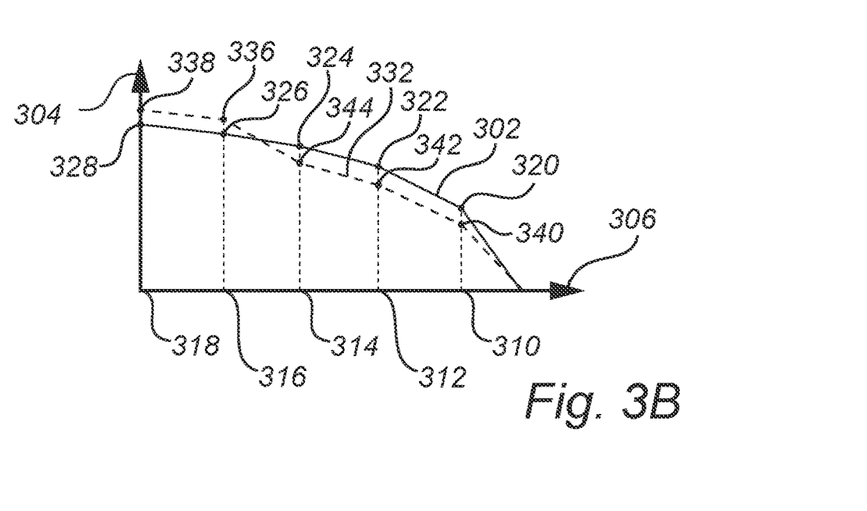

In order to describe operation of the present inventive concept, reference is now made to FIG. 3a-3b. FIGS. 3A-3B are graphs illustrating a relationship between reducing agent buffer and temperature according to examples. In particular, the vertical axes 304 represent an expected buffer of reducing agent 224 in the catalytic reduction arrangement 210, while the horizontal axes 306 represent a temperature level of the catalytic reduction arrangement 210. The solid line 302 FIG. 3A is intended to represent the relationship between the reducing agent buffer in the catalytic reduction arrangement 210 for various temperature levels before initiating operation of the inventive concept disclosed herein. In the FIG. 3A example, reducing agent 224 is injected into the catalytic reduction arrangement 210 at a pre-set mass flow rate, wherein the pre-set mass flow rate may be different for each of the plurality of temperature levels. As can be seen, the expected buffer of reducing agent is expected to be reduced when the temperature of the catalytic reduction arrangement 210 increases. Thus, for a first temperature level 310, reducing agent 224 is injected at a first pre-set mass flow rate forming a first expected reducing agent buffer 320 for the first temperature level 310 in the catalytic reduction arrangement 210. In a similar vein, for a second temperature level 312, reducing agent 224 is injected at a second pre-set mass flow rate forming a second expected reducing agent buffer for the second temperature level 312 in the catalytic reduction arrangement 210. A third 324, a fourth 326, and a fifth 328 reducing agent buffer is expected when injecting reducing agent 224 at a third, a fourth, and a fifth pre-set mass flow rate for a third 314, a fourth 316, and a fifth 318 temperature level, respectively, to generate the graph of FIG. 3A.

The following will mainly, and initially, describe the operation of the present inventive concept with reference to the first temperature level 310 of the catalytic reduction arrangement 210. During operation, when the temperature of the catalytic reduction arrangement 210 is at the first temperature level 310, a reference level of toxic substances exhausted from the catalytic reduction arrangement 210 when injecting reducing agent 224 at the first pre-set mass flow rate is determined. The pre-set mass flow rate is preferably injected based on a predefined injection model. In particular, the sensor 230 preferably detects the reference level of toxic substances and transmits data indicative of the level of toxic substances to the processing circuitry.

For a similar operating condition of the catalytic reduction arrangement 210, i.e., when the temperature of the catalytic reduction arrangement 210 is at the first temperature level 210, and optionally also when an exhaust gas flow velocity is similar to when detecting the reference level of toxic substances, the injector manager 240 transmits a message to the reducing agent injector 222 to inject reducing agent 224 at a first mass flow rate. The first mass flow rate is different from the pre-set mass flow rate. In the present example, the first mass flow rate is higher than the pre-set mass flow rate, thereby providing a first higher 330 expected reducing agent buffer in the catalytic reduction arrangement 210. When the reducing agent injector 222 has injected the reducing agent 224 at the first mass flow rate, a first level of toxic substances exhausted from the catalytic reduction arrangement is determined, preferably by the sensor 230. The processing circuitry determines which one of the reference level of toxic substances and the first level of toxic substances being a lowest level of toxic substances, i.e. the processing circuitry compares the reference level of toxic substances and the first level of toxic substances with each other to determine which one of the mass flow rates generating the lowest level of toxic substances.

Thereafter, the processing circuitry updates the pre-set mass flow rate of the predefined injection model to an updated pre-set mass flow rate. The updated pre-set mass flow rate is selected as the one of the pre-set mass flow rate and the first mass flow rate that generates the lowest levels of toxic substances, i.e. the mass flow rate causing the catalytic reduction arrangement 210 to exhaust the lowest level of toxic substances. The injection manager thereafter transmits a message to the reducing agent with instructions to inject reducing agent 224 at the updated pre-set mass flow rate for the first temperature level 310.

As an example, and as an intermediate step, the injection manager 240 may transmit data to the reducing agent injector 222 to inject reducing agent at a second mass flow rate, wherein the second mass flow rate is a decreased/reduced mass flow rate compared to the pre-set mass flow rate. The second mass flow rate thus provides a first lower 340 expected reducing agent buffer in the catalytic reduction arrangement 210. The second mass flow rate is thus lower than the pre-set mass flow rate. In a similar vein as described above, when the reducing agent injector 222 has injected the reducing agent 224 at the second, lower mass flow rate, a second level of toxic substances exhausted from the catalytic reduction arrangement is determined, preferably by the sensor 230.

Hereby, the level of toxic substances exhausted from the catalytic reducing arrangement 210 can be determined for a first mass flow rate, the second mass flow rate, and for the pre-set mass flow rate, whereby the mass flow rate providing the lowest levels of toxic substances is selected as the updated pre-set mass flow rate. In the present example illustrated in FIGS. 3A-3B, the second mass flow rate is selected as the updated pre-set mass flow rate for the first temperature, since the second mass flow rate turned out to cause the catalytic reduction arrangement 210 to reduce the level of toxic substances.

The operating steps described above in relation to the first temperature level 310 is thereafter performed, preferably sequentially, for the second 312, third 314, fourth 316 and fifth 318 temperature levels, which results in an updated relationship between expected reducing agent buffer in the catalytic reduction arrangement 210 for various temperature levels, which is indicated with the dashed line 332.

In the exemplified illustration in FIG. 3B, the mass flow rate is reduced for the first 310, second 312 and third 314 temperature levels, while the mass flow rate is increased for the fourth 316 and fifth 318 temperature levels. In other words, the mass flow rate for the different temperature is selected such that a second lower 342 expected reducing agent buffer is provided for the second temperature level 312, a third lower 344 expected reducing agent buffer is provided for the third temperature level 314, a fourth higher 336 is provided for the fourth temperature level 316, and a fifth higher 338 expected reducing agent buffer is provided for the fifth temperature level 318. The pre-set mass flow rate of the predefined injection model is hereby updated for each temperature level as indicated in FIG. 3B.

It should however be readily understood that the illustration in FIG. 3B merely serves as one example. For example, the updated mass flow rate at, e.g., one or more of the first 310, second 312 and third 314 temperature levels could be increased compared to the pre-set mass flow rate if the level of toxic substances was reduced for such increase. Similarly, the mass flow rate at one or both of the fourth 316 and fifth 318 temperature levels could be reduced compared to the pre-set mass flow rate if the level of toxic substances was reduced for such reduction. Also, further or less temperature levels may be used for the evaluation.

In order to reduce the consumption of reducing agent, the second mass flow rate is preferably selected as the updated pre-set mass flow rate when the reference level of toxic substances, the first level of toxic substances and the second level of toxic substances are within a predetermined range. Thus, if no substantial difference in toxic substances is detected for the different mass flow rates, the lowest mass flow rate can be selected.

Figure 4:
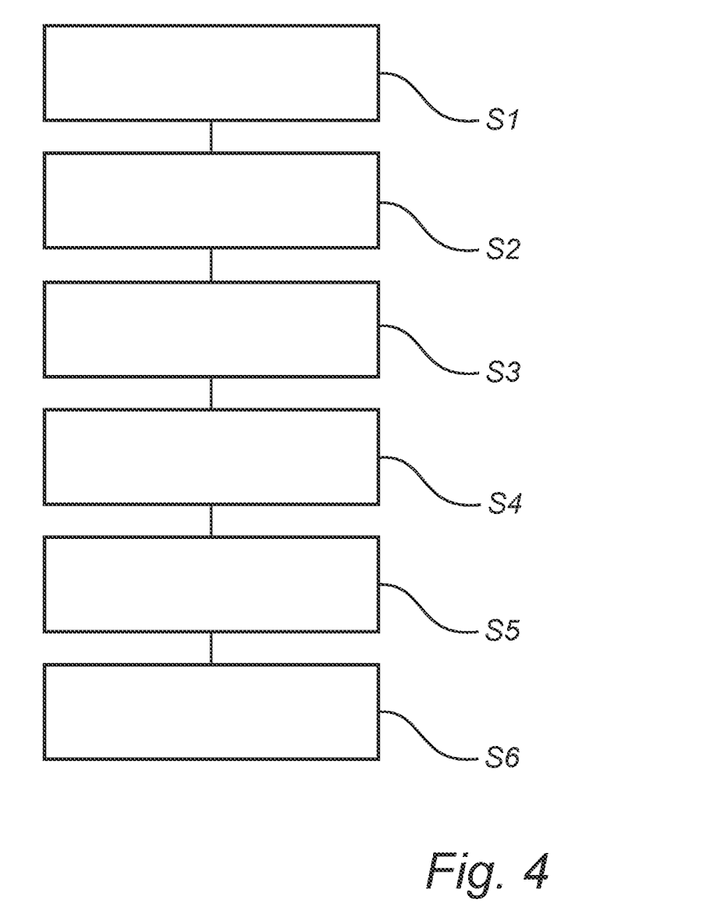
FIG. 4 is a flow chart of operating a reducing agent injector according to one example.

Reference is now made to FIG. 4 which is a flow chart of a method of operating the above described reducing agent injector 222. As described above, a reference level of toxic substances exhausted from the catalytic reduction arrangement 210 is determined S1 when injecting reducing agent at the pre-set mass flow rate. The reducing agent injector 222 is controlled S2 to inject reducing agent at a first mass flow rate, the first mass flow rate being different from the pre-set mass flow rate. A first level of toxic substances exhausted from the catalytic reduction arrangement 220 is determined S3 after injecting reducing agent 224 at the first mass flow rate. It is thereafter determined S4 which one of the reference level of toxic substances and the first level of toxic substances being a lowest level of toxic substances. The pre-set mass flow rate of the predefined injection model is then updated S5 to an updated pre-set mass flow rate as the mass flow rate causing the catalytic reduction arrangement 220 to exhaust the lowest level of toxic substances. The reducing agent injector 222 is then controlled S6 to inject reducing agent at the updated pre-set mass flow rate.

Figure 5:
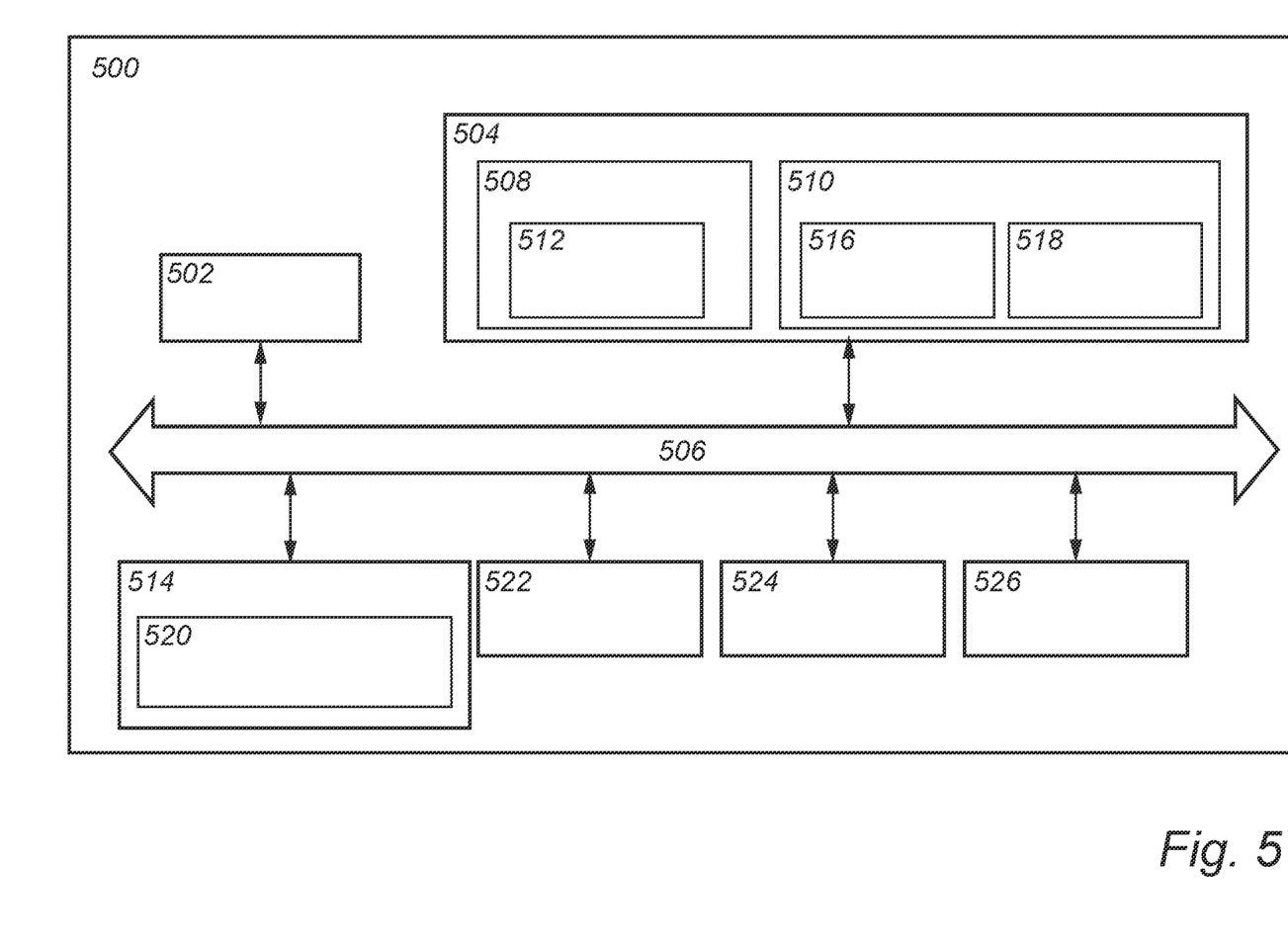
FIG. 5 is a schematic diagram of an exemplary computer system for implementing examples disclosed herein, according to one example.

Turning now to FIG. 5, which is a schematic diagram of an exemplary computer system for implementing examples disclosed herein, according to one example.

FIG. 5 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include a processing circuitry 502 (may also be referred to as a control unit), a memory 504, and a system bus 506. The computer system 500 may include at least one computing device having the processing circuitry 502. The system bus 506 provides an interface for system components including, but not limited to, the memory 504 and the processing circuitry 502. The processing circuitry 502 may include any number of hardware components for conducting data or signal processing or for executing computer code stored in memory 504. The processing circuitry 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out the steps described herein. Thus, the computer-readable program code can comprise software instructions for implementing the functionality of the examples described herein when executed by the processing circuitry 502. The processing circuitry 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 526 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the inventive concept. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present inventive concept.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present inventive concept is not limited to the aspects described above and illustrated in the drawings; rather, the skilled person will recognize that many changes and modifications may be made within the scope of the present inventive concept and appended claims. In the drawings and specification, there have been disclosed aspects for purposes of illustration only and not for purposes of limitation, the scope of the inventive concepts being set forth in the following claims.

The invention claimed is:

1. A method of operating a reducing agent injector, the reducing agent injector being configured to inject a reducing agent into a catalytic reduction arrangement arranged in downstream fluid communication with an internal combustion engine of a vehicle at a pre-set mass flow rate obtained by a predefined injection model,
the method comprising:
    determining a reference level of toxic substances exhausted from the catalytic reduction arrangement when injecting reducing agent at the pre-set mass flow rate;
    controlling the reducing agent injector to inject reducing agent at a first mass flow rate, the first mass flow rate being an increased mass flow rate compared to the pre-set mass flow rate;
    determining a first level of toxic substances exhausted from the catalytic reduction arrangement after injecting reducing agent at the first mass flow rate;
    controlling the reducing agent injector to inject reducing agent at a second mass flow rate, the second mass flow rate being a decreased mass flow rate compared to the pre-set mass flow rate;
    determining a second level of toxic substances exhausted from the catalytic reduction arrangement after injecting reducing agent at the second mass flow rate;
    determining which one of the reference level of toxic substances, the first level of toxic substances and the second level of toxic substances being a lowest level of toxic substances;
    updating the pre-set mass flow rate of the predefined injection model to an updated pre-set mass flow rate as the mass flow rate causing the catalytic reduction arrangement to exhaust the lowest level of toxic substances; and
    controlling the reducing agent injector to inject reducing agent at the updated pre-set mass flow rate.

2. The method according to claim 1, the method further comprising:
    determining a first operating state of the catalytic reduction arrangement when determining the reference level of toxic substances, the first operating state being at least one of a reference temperature level of the catalytic reduction arrangement and an exhaust gas flow velocity through the catalytic reduction arrangement; and
    controlling the reducing agent injector to inject reducing agent at the first mass flow rate when the catalytic reduction arrangement assumes the first operating state.

3. The method according to claim 1, further comprising:
    selecting the second mass flow rate as the updated pre-set mass flow rate when the reference level of toxic substances, the first level of toxic substances and the second level of toxic substances are within a predetermined range.

4. The method according to claim 1, wherein reducing agent is injected at a second mass flow rate when the catalytic reduction arrangement assumes the first operating state.

5. The method according to claim 1, wherein the pre-set mass flow rate of the predefined injection model is updated for a plurality of temperature levels of the catalytic reduction arrangement.

6. The method according to claim 5, wherein the pre-set mass flow rate of the predefined injection model is updated sequentially for the plurality of temperature levels of the catalytic reduction arrangement.

7. The method according to claim 1, wherein the catalytic reduction arrangement is a selective catalytic reduction arrangement.

8. A control system comprising one or more control units configured to perform the method according to claim 1.

9. A non-transitory computer-readable storage medium comprising instructions, which when executed by a processing circuitry, cause the processing circuitry to perform the method of claim 1.

10. An injection system, comprising
    a reducing agent injector configured to inject a reducing agent into a catalytic reduction arrangement arranged in downstream fluid communication with an internal combustion engine of a vehicle, and processing circuitry operatively coupled to the reducing agent injector, the processing circuitry comprises an injection manager operative to instruct the reducing agent injector to inject reducing agent at a pre-set mass flow rate, wherein the processing circuitry is configured to:

determine a reference level of toxic substances exhausted from the catalytic reduction arrangement when injecting reducing agent at the pre-set mass flow rate;

transmit a message to the reducing agent injector, the message representing instructions to control the reducing agent injector to inject reducing agent at a first mass flow rate, the first mass flow rate being an increased mass flow rate compared to the pre-set mass flow rate;

determine a first level of toxic substances exhausted from the catalytic reduction arrangement after injecting reducing agent at the first mass flow rate;

control the reducing agent injector to inject reducing agent at a second mass flow rate, the second mass flow rate being a decreased mass flow rate compared to the pre-set mass flow rate;

determine a second level of toxic substances exhausted from the catalytic reduction arrangement after injecting reducing agent at the second mass flow rate;

determine which one of the reference level of toxic substances, the first level of toxic substances and the second level of toxic substances being a lowest level of toxic substances;

update the pre-set mass flow rate of the predefined injection model to an updated pre-set mass flow rate as the mass flow rate causing the catalytic reduction arrangement to exhaust the lowest level of toxic substances; and transmit a message to the reducing agent injector, the message representing instructions to control the reducing agent injector to inject reducing agent at the updated pre-set mass flow rate.

11. The injection system according to claim 10, the injection system further comprising a sensor configured to detect the level of toxic substances exhausted from the catalytic reduction arrangement.

12. The injection system according to claim 11, wherein the sensor is a NOx sensor.

13. A vehicle comprising an internal combustion engine, a catalytic reduction arrangement arranged in downstream fluid communication with the internal combustion engine, and an injection system according to claim 10.

* * * * *